United States Patent
Borgen

(10) Patent No.: US 8,908,470 B2
(45) Date of Patent: Dec. 9, 2014

(54) SOLID SEISMIC STREAMER CABLE AND METHOD

(75) Inventor: Lars Borgen, Sande (NO)

(73) Assignee: WesternGeco L.L.C., Houston, TX (US)

( * ) Notice: Subject to any disclaimer, the term of this patent is extended or adjusted under 35 U.S.C. 154(b) by 601 days.

(21) Appl. No.: 12/611,667

(22) Filed: Nov. 3, 2009

(65) Prior Publication Data

US 2011/0103180 A1    May 5, 2011

(51) Int. Cl.
*G01V 1/38* (2006.01)
*G01V 13/00* (2006.01)
*G01V 1/20* (2006.01)

(52) U.S. Cl.
CPC .......... *G01V 1/201* (2013.01); *G01V 2001/204* (2013.01); *G01V 13/00* (2013.01)
USPC .......................................................... 367/20

(58) Field of Classification Search
CPC . G01V 13/00; G01V 1/201; G01V 2001/201; G01V 2001/204
USPC .......... 138/110, 113; 174/47, 101.5, 69, 73.1, 174/75 F, 97, 126.3, 136; 181/108; 264/45.3; 367/20, 21, 62, 154; 439/66, 439/74, 284; 29/428
See application file for complete search history.

(56) References Cited

U.S. PATENT DOCUMENTS

| | | | |
|---|---|---|---|
| 4,510,588 A * | 4/1985 | Kruka et al. | 367/165 |
| 4,937,794 A * | 6/1990 | Marschall et al. | 367/21 |
| 4,998,227 A | 3/1991 | Rygg et al. | |
| 5,274,603 A | 12/1993 | Zibilich et al. | |
| 5,299,939 A * | 4/1994 | Walker et al. | 439/74 |
| 5,867,451 A | 2/1999 | Chang et al. | |
| 6,239,363 B1 * | 5/2001 | Wooters | 174/47 |
| 7,142,481 B1 * | 11/2006 | Metzbower et al. | 367/154 |
| 7,184,366 B1 * | 2/2007 | Harrick et al. | 367/20 |
| 2006/0117874 A1 | 6/2006 | Goujon et al. | |

FOREIGN PATENT DOCUMENTS

DE    4222269 A1 *  1/1994 ............... H01B 7/06

OTHER PUBLICATIONS

International Search Report issued in PCT/US2010/053775 on Jun. 30, 2011, 3 pages.

* cited by examiner

*Primary Examiner* — Daniel L Murphy
(74) *Attorney, Agent, or Firm* — Kevin B. McGoff; Kevin McEnaney

(57) ABSTRACT

An apparatus includes a streamer cable having one or more seismic devices disposed within a polymer body and about a core. The polymer body includes a channel defined therein for receiving one or more wires connecting the seismic devices. The wires include slack for withstanding the tensional forces experienced by the streamer cable during deployment and operation. Associated methods are also described.

19 Claims, 4 Drawing Sheets

SOLID SEISMIC STREAMER CABLE AND METHOD

BACKGROUND

This disclosure generally relates to towed streamers for use in acquiring seismic data, and more specifically, to solid streamers and methods of manufacturing same.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

Streamers are long cables that house various sensor networks and other devices useful in the acquisition of seismic data. Streamers may be manufactured as liquid-filled streamers or solid streamers. Prior art solid streamer cables are often constructed with a central core with transmission and power bundles that are continuous through the streamer section (a segmented portion of a streamer cable). The transmission and power bundles are typically connected to electronics modules between the streamer sections through end connectors. Also within a streamer section, there is a need to connect distributed sensors and (if present) sensor electronics by wires to transmit power and data to the electronics modules.

In solid streamer cables, it is often a challenge to have wires run external to the stress member armoring because the bending forces experienced by the streamer cable impart local deformations that may introduce tensile or compressional stress in the wires. These stresses may eventually lead to deformations and/or breaks of the wires. The common way in the prior art to remove or reduce this effect is to twist the wires with a certain lay length around the stress member, which thus cancels the compressional and tensional forces experienced by the wires. However, the manufacturing and repair processes associated with utilizing twisted sensor wires and/or local electronics network wires are complicated.

FIG. 1 illustrates a prior art arrangement in which a solid streamer cable 10 includes a central core 12 having a transmission bundle 14 surrounded by a strength member 16. The central core 12 is typically pre-fabricated before adding sensors and/or sensor electronics. Local wiring 18, which is used to connect the sensor and sensor electronics, is also disposed in the streamer cable 10 inside of a polymer body 20 and a skin 22. The typical way to dispose the wiring 18 within the streamer cable 10 is to twist the wiring onto the central core 12 with a certain lay-length (or pitch) to allow for tensile cycling and bending of the streamer cable 10 without generating high stresses in the wires. Wiring layers in prior art solid cables are often pre-made with the central core 12.

One of the drawbacks associated with the prior art solid cable 10 of FIG. 1 is that it complicates the manufacturing process by making it difficult to access and thereby connect the local wiring 18 to the sensors and/or sensor electronics. More particularly, it is difficult to open the local wiring 18 and cut the correct wires at the desired inline and rotational location. It is also challenging to obtain the desired slack in the wiring 18 to robustly establish connection between the wiring and the sensors and/or sensor electronics. In addition, connection of the wiring 18 to the sensors and/or sensor electronics has to be done late in the assembly process of the cable 10. This makes the manufacturing process complex as many units have to come together at the same production step.

SUMMARY

This disclosure is related to a solid streamer cable and a method of manufacturing same. In one embodiment, the streamer cable includes a local wiring scheme that imparts elastic elongation in a simple manner. The wiring scheme may be designed to run inline with the cable core and may be S-shaped or corrugated to thus incorporate the desired slack such that the wiring scheme can withstand both tension variations as well as bending forces. In some embodiments, a simpler manufacturing process can be employed as seismic sensors and the local wiring network can be pre-made prior to manufacturing the total seismic streamer section.

Advantages and other features of the present disclosure will become apparent from the following drawing, description and claims.

DETAILED DESCRIPTION

Figure 1:
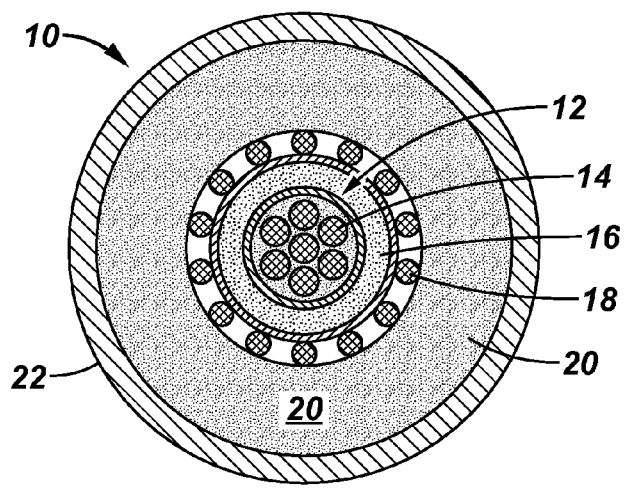
FIG. 1 is a cross-sectional view of a prior art solid streamer cable.
Figure 2:
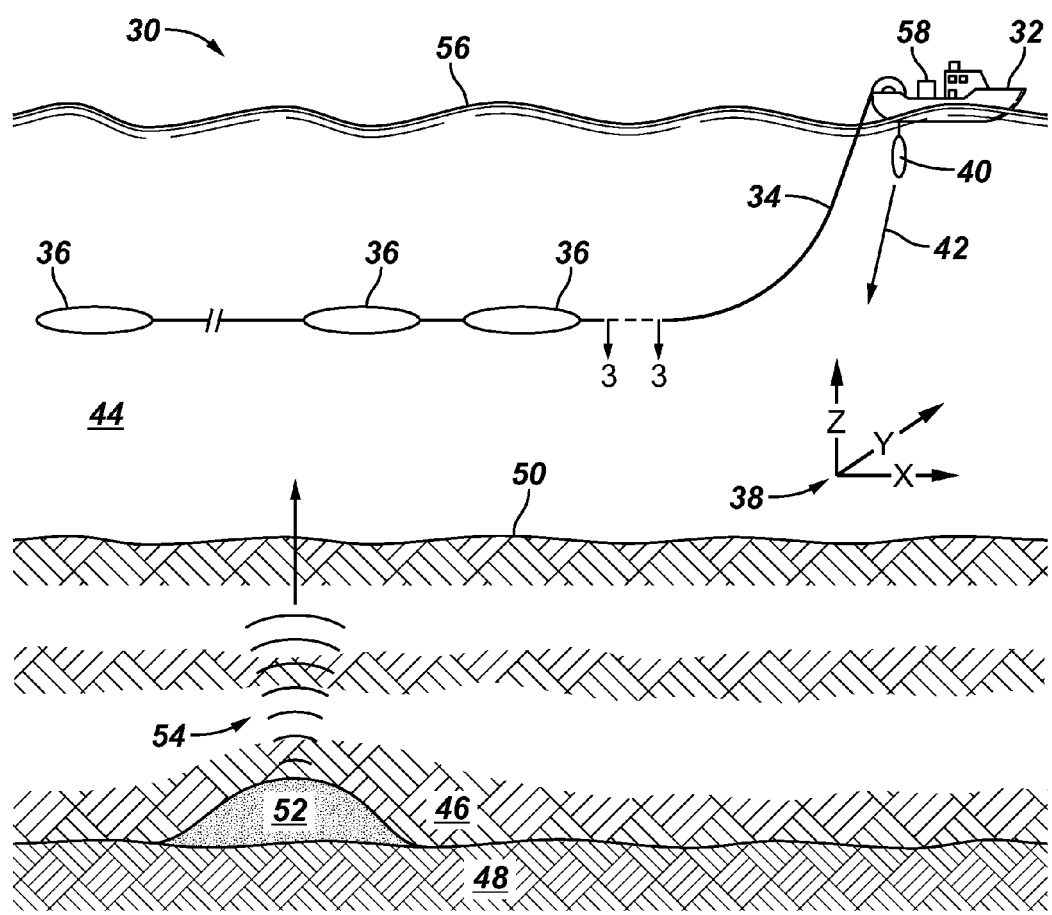
FIG. 2 is a schematic diagram of a marine seismic data acquisition system according to an embodiment of the disclosure.

FIG. 2 depicts an embodiment 30 of a marine seismic data acquisition system in accordance with some embodiments of the disclosure. In the system 30, a survey vessel 32 tows one or more seismic streamers 34 (one exemplary streamer 34 being depicted in FIG. 1) behind the vessel 20. The seismic streamers 34 may be several thousand meters long and may contain various support cables (not shown), as well as wiring and/or circuitry (not shown) that may be used to support communication along the streamers 34. In general, each streamer 30 includes a primary cable into which is mounted seismic sensors 36 that record seismic signals. It is to be appreciated that the sensors 36 are illustrated schematically for emphasis in FIG. 2, and that in practice, the sensors 36 are disposed within the streamer cable 34.

In accordance with embodiments of the disclosure, the seismic sensors 36 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 38, for example)) of a particle velocity and one or more components of a particle acceleration.

Depending on the particular embodiment of the disclosure, the multi-component seismic sensor may include one or more hydrophones, geophones, particle displacement sensors, particle velocity sensors, accelerometers, pressure gradient sensors, or combinations thereof.

For example, in accordance with some embodiments of the disclosure, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 40 that may be formed from one or more seismic source elements, such as air guns, for example, which are connected to the survey vessel 32. Alternatively, in other embodiments of the disclosure, the seismic source 40 may operate independently of the survey vessel 32, in that the seismic source 40 may be coupled to other vessels or buoys, as just a few examples.

As the seismic streamers 34 are towed behind the survey vessel 32, acoustic signals 42 (an exemplary acoustic signal 42 being depicted in FIG. 2), often referred to as "shots," are produced by the seismic source 40 and are directed down through a water column 44 into strata 46 and 48 beneath a water bottom surface 50. The acoustic signals 42 are reflected from the various subterranean geological formations, such as an exemplary formation 52 that is depicted in FIG. 2.

The incident acoustic signals 42 that are produced by the sources 40 produce corresponding reflected acoustic signals, or pressure waves 54, which are sensed by the seismic sensors 36. It is noted that the pressure waves that are received and sensed by the seismic sensors 36 include "up going" pressure waves that propagate to the sensors 36 without reflection, as well as "down going" pressure waves that are produced by reflections of the pressure waves 54 from an air-water boundary 56.

The seismic sensors 36 generate signals (digital signals, for example), called "traces," which indicate the acquired measurements of the pressure wavefield and particle motion (if the sensors are particle motion sensors). The traces are recorded and may be at least partially processed by a signal processing unit 58 that is deployed on the survey vessel 32, in accordance with some embodiments of the disclosure. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 52. Subsequent analysis of the representation may reveal probable locations of hydrocarbon deposits in subterranean geological formations. Depending on the particular embodiment of the disclosure, portions of the analysis of the representation may be performed on the seismic survey vessel 32, such as by the signal processing unit 58.

Figure 3:
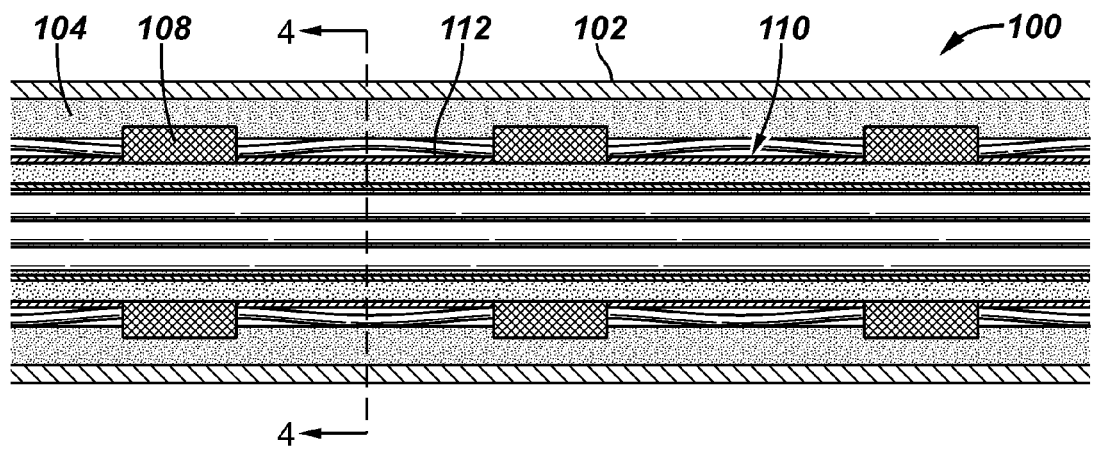
FIG. 3 is a cut-away view of a streamer cable according to one embodiment of the present disclosure.
Figure 4:
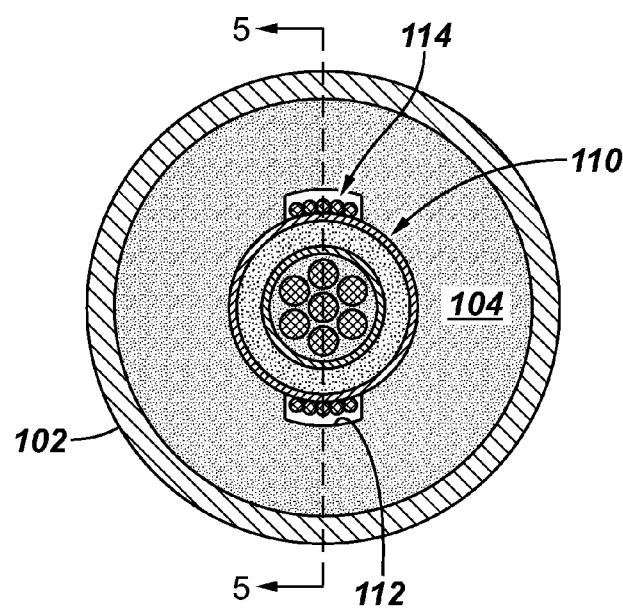
FIG. 4 is a cross-sectional view of the streamer cable taken along the line 4-4 in FIG. 3.

Referring to FIG. 3, a solid streamer cable 100 according to one embodiment of the present disclosure includes a skin 102 for enclosing a polymer body 104 and one or more seismic devices 108 for use in seismic data acquisition. The seismic devices 108 may include seismic sensors (e.g., geophone, hydrophone and/or accelerometer) and/or sensor electronics that generally manipulate data acquired by the seismic sensors, such as an analog to digital converter that digitizes the analog data acquired by the sensors. In practice, the seismic devices 108 may be disposed within a housing. A core 110 is also disposed within the streamer cable 100 and may comprise a strength member and often also a transmission bundle (not shown). In some embodiments, the core 110 is substantially solid. A channel 112 is formed in the polymer body 104 in an area generally adjacent to the core 110. In some embodiments, the channel 112 is formed in the polymer body 104 away from the core 110. Referring to FIG. 4, the channel 112 provides a pathway for a wire bundle 114 to connect the various seismic devices 108 disposed within the streamer cable 100. In this embodiment, the wire bundle 114 extends through the channel inline with the central core, thus providing easy access to the wire bundle for technicians to connect and/or disconnect the wires to the associated seismic devices 108.

Figure 5:
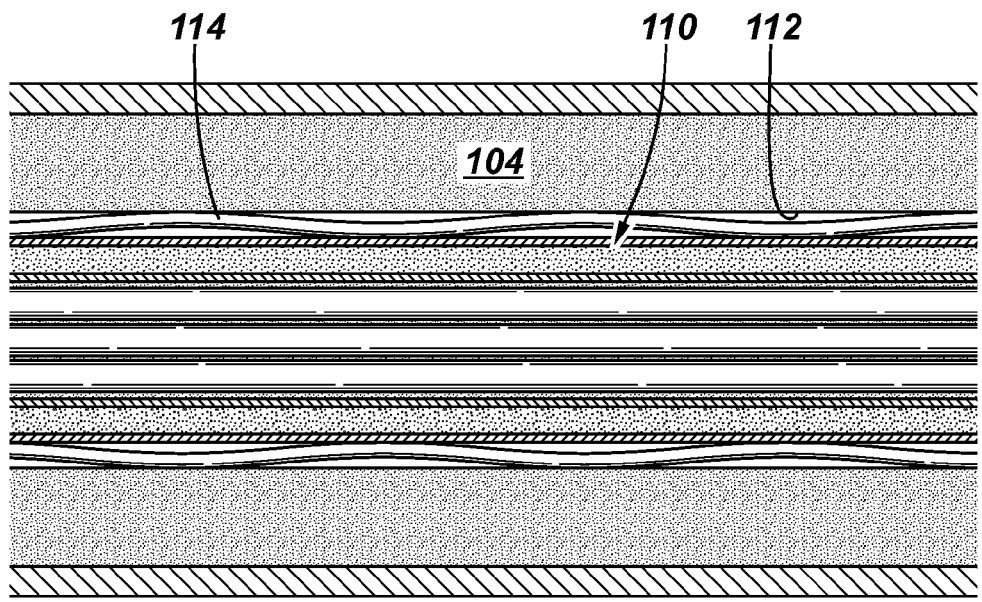
FIG. 5 is a cross-sectional view of the streamer cable taken along the line 5-5 in FIG. 4.

Referring to FIG. 5, the wires 114 are formed such that they have slack when extending through the streamer cable 100. Slack may be imparted to the wires 114 by ensuring that the wires are longer when straight than the streamer cable 100. The additional length of the wires 114 relative to the streamer cable may be referred to as "over-length." To accommodate the over-length, the wires 114 may be formed to have a corrugated or S-shape when extending through the cable. In corrugated embodiments, the wires 114 may be run through teethed wheels or pre-formed plates to thus impart corrugation to the wires prior to insertion in the streamer cable 100. By having slack, the wires 114 are able to withstand the various compressional or tensional loads experienced by the streamer cable 100 during deployment and operation.

Figure 6:
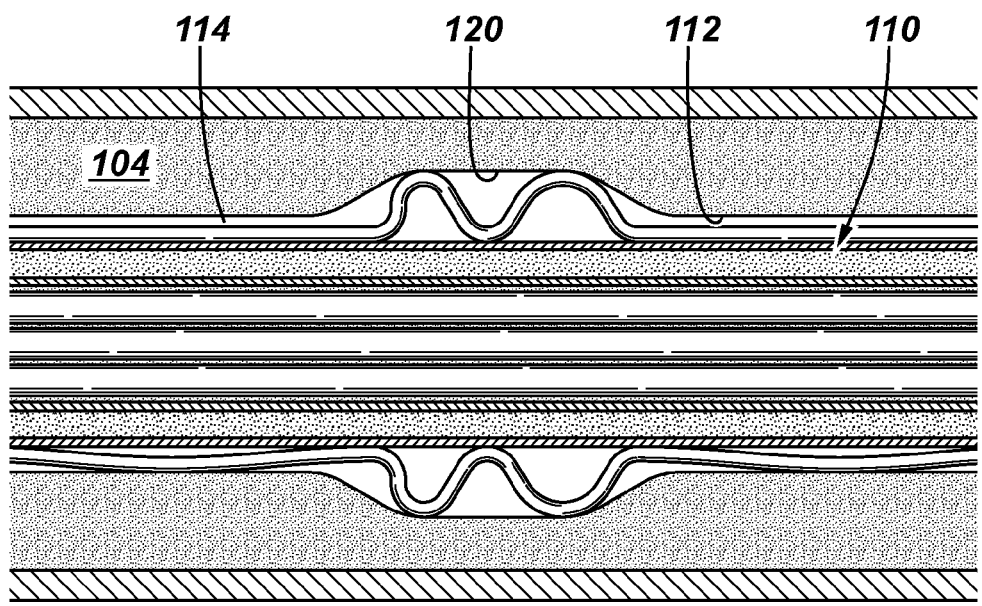
FIG. 6 is a modification of FIG. 5 to illustrate another embodiment of the present disclosure.

It is to be appreciated that additional manners for imparting slack to the wires 114 are contemplated. For example, with reference to FIG. 6, slack may be imparted to the wires 114 only at certain points along the channel 112. To accommodate such slack, enlarged cavities, such as cavity 120, may be defined in the polymer body 104 along certain portions of the channel 112. Accordingly, in this embodiment, the wires 114 are substantially taut along some segments of the channel 112 but do incorporate slack at the enlarged cavities 120.

Figure 7:
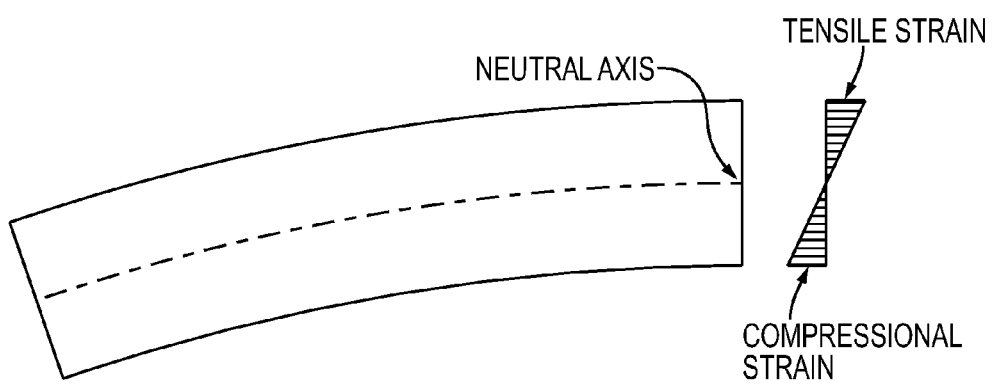
FIG. 7 is a stress diagram illustrating exemplary stress forces undergone by the streamer cable of FIGS. 3-5.

By imparting slack to the wires 114, elongation or bending of the streamer cable will only impose a portion of the tensional forces experienced by the streamer cable 100 onto the wires compared to the greater amount of tensional forces that would be experienced by taut wires. In practice, streamer cables are typically rolled on a spool and placed on a vessel for deployment at sea. As can be appreciated, rolling a streamer cable on a spool introduces undesirable bending strains, particularly with respect to solid streamer cables. Referring to FIG. 7, the maximum bending strain over the cross section for the cable 100 will be influenced by the cable and spool diameter. In one example, if the cable diameter is 50 mm and the spool diameter is 1400 mm, the maximum bending strain would be calculated as 3.44% at the outermost portion of the cable (25 mm out of center). Such strain will be realized as compression and tensile strain over the cross section of the cable 100. Compression and tensile strain experienced by the wires 114 can lead to undesirable wire breaks. Prior art streamer cables sought to address this problem by twisting or coiling the wire around the streamer core, thus canceling out the compression and tensile strains. The present disclosure, however, accounts for such strain by incorporating slack into the wires 114, thus imposing only a portion of the tensional forces experienced by the streamer cable 100 onto the wires. This permits the wires 114 to be placed eccentrically within the streamer cable, which, in turn, allows for easy access to the wires for connection and/or repair.

The manufacturing process associated with assembling the streamer cable 100 according to the present disclosure can thus be simplified. In particular, by placing the wires 114 through the inline channel 112, the sensors 106 and wires can be connected, tested and pre-made before the step of assembling the sensors and core 110 together. In one embodiment, this can be realized if the polymer body 104 was manufactured in two halves (or other multiple) that are then secured together during manufacturing. In another embodiment, the sensor network (sensor 106, wires 114 and electronics 108) may be pre-assembled inside a portion of the polymer body 104 and then later assembled together with the core 110.

While the present disclosure has been described with respect to a limited number of embodiments, those skilled in the art, having the benefit of this disclosure, will appreciate numerous modifications and variations therefrom. For example, the wire bundle 114 may contain one or more wires and thus this disclosure is not limited to only those embodiments having a plurality of wires in the wire bundle. Also, the channel 112 and cavity 120 may be filled with air or a compliant material. It is intended that the appended claims cover all such modifications and variations as fall within the true spirit and scope of this present disclosure.

What is claimed is:

1. A streamer cable, comprising:
    a core internally comprising a strength member, the core extending longitudinally along the streamer cable;
    a polymer body surrounding the core, the polymer body having a channel defined therein, the channel having an opening that faces internally and that is adjacent to the core;
    a plurality of seismic devices for use in seismic data acquisition; and
    wire connecting the seismic devices, whereby slack is imparted to the wire and the wire extends through the channel, wherein the slack is imparted by the wire being longer when straight than the length of the streamer cable.

2. The streamer cable of claim 1, wherein the channel is defined in the polymer body and the channel extends longitudinally along and adjacent to the core.

3. The streamer cable of claim 1, wherein the channel is defined in the polymer body in a spaced relation with the core.

4. The streamer cable of claim 1, wherein the seismic devices comprise sensor electronics.

5. The streamer cable of claim 1, wherein the seismic devices comprise sensors.

6. The streamer cable of claim 1, wherein the seismic devices comprise sensors and sensor electronics.

7. The streamer cable of claim 1, further comprising one or more cavities defined in the polymer body, the one or more cavities being in communication with the channel and enlarged relative to the channel, and wherein the wire is corrugated in the one or more cavities.

8. The streamer cable of claim 1, wherein the channel extends inline with the core.

9. The streamer cable of claim 1, wherein the seismic devices comprise at least one accelerometer.

10. The streamer cable of claim 1, wherein the polymer body comprises two halves connected together.

11. A seismic spread, comprising:
    a solid streamer cable, comprising:
        a core surrounded by a polymer body, the polymer body having a channel defined therein, the channel having an opening that faces internally and that is adjacent to the core;
        a plurality of seismic devices for use in seismic data acquisition; and
        wire extending through the channel and connecting the seismic devices, whereby slack is imparted to the wire, wherein the slack is imparted by the wire being longer when straight than the length of the streamer cable; and
    a vessel for towing the streamer cable.

12. The seismic spread of claim 11, wherein the channel is defined in the polymer body and the channel extends longitudinally along and adjacent to the core.

13. The seismic spread of claim 11, wherein the channel is defined in the polymer body in a spaced relation with the core.

14. The seismic spread of claim 11, wherein the streamer cable further comprises one or more cavities defined in the polymer body, the one or more cavities being in communication with the channel and enlarged relative to the channel, and wherein the wire is corrugated in the one or more cavities.

15. The seismic spread of claim 11, wherein the channel extends inline with the core.

16. The seismic spread of claim 11, wherein the seismic devices comprise at least one accelerometer.

17. The seismic spread of claim 11, wherein the polymer body comprises two halves connected together.

18. A streamer cable, comprising:
    a core internally comprising a strength member, the core extending longitudinally along the streamer cable;
    a polymer body surrounding the core, the polymer body comprising two halves that are connected together, the polymer body having a channel defined therein, wherein the channel comprises an opening internally facing the core;
    a plurality of seismic devices for use in seismic data acquisition; and
    wire connecting the plurality of seismic devices, whereby slack is imparted to the wire and the wire extends through the channel, wherein the slack is imparted by the wire being longer when straight than the length of the streamer cable.

19. The streamer cable of claim 18, further comprising spaced apart cavities formed in the polymer body in communication with the channel, wherein the cavities are enlarged relative to the channels and the wire disposed in the cavities in corrugated.

* * * * *